US009080782B1

(12) United States Patent
Sheikh

(10) Patent No.: US 9,080,782 B1
(45) Date of Patent: Jul. 14, 2015

(54) HOME AUTOMATION SYSTEM PROVIDING REMOTE ROOM TEMPERATURE CONTROL

(76) Inventor: Babak Sheikh, Weston, FL (US)

( * ) Notice: Subject to any disclaimer, the term of this patent is extended or adjusted under 35 U.S.C. 154(b) by 467 days.

(21) Appl. No.: 13/559,803

(22) Filed: Jul. 27, 2012

(51) Int. Cl.
*G06F 19/00* (2011.01)
*F24F 11/00* (2006.01)
*G05B 15/02* (2006.01)

(52) U.S. Cl.
CPC ............... *F24F 11/00* (2013.01); *G05B 15/02* (2013.01)

(58) Field of Classification Search
CPC ....... F24F 11/00; F24F 11/0009; G05B 15/02
USPC .......................... 700/275, 276, 277; 236/44 R
See application file for complete search history.

(56) References Cited

U.S. PATENT DOCUMENTS

| | | | |
|---|---|---|---|
| 4,969,508 A | 11/1990 | Tate et al. | |
| 5,386,461 A | 1/1995 | Gedney | |
| 5,839,654 A | 11/1998 | Weber | |
| 7,009,510 B1* | 3/2006 | Douglass et al. | 340/531 |
| 7,299,068 B1* | 11/2007 | Halla et al. | 455/561 |
| 7,702,421 B2* | 4/2010 | Sullivan et al. | 700/276 |
| 2005/0159823 A1 | 7/2005 | Hayes et al. | |
| 2007/0067062 A1* | 3/2007 | Mairs et al. | 700/275 |
| 2007/0265712 A1* | 11/2007 | Leontiev et al. | 700/3 |
| 2008/0318564 A1* | 12/2008 | Kreiner et al. | 455/420 |
| 2010/0200664 A1* | 8/2010 | Drew | 236/94 |
| 2010/0211224 A1* | 8/2010 | Keeling et al. | 700/277 |
| 2012/0072029 A1* | 3/2012 | Persaud et al. | 700/276 |
| 2012/0158203 A1* | 6/2012 | Feldstein | 700/295 |
| 2013/0123991 A1* | 5/2013 | Richmond | 700/276 |

OTHER PUBLICATIONS

Fanara, Andrew, et al. "How Small Devices are Having a Big Impact on US Utility Bills." 2006.*

* cited by examiner

*Primary Examiner* — Michael D Masinick
(74) *Attorney, Agent, or Firm* — Malin Haley DiMaggio & Bowen, P.A.

(57) ABSTRACT

A system and method of home automation comprising one or more remote thermostats each having an environmental sensor array configured to sense temperature and humidity and at least one thermostat controller in electrical communication with an HVAC system. The remote thermostats and the thermostat controller are in electrical communication over a local area network, which may be wired or wireless. The thermostat controller receives, over the local area network, computer-readable environmental data from the remote thermostats corresponding to the temperature and said humidity in the location where the remote thermostat is installed. The thermostat controller conditionally controls the HVAC system based on the environmental data received from the remote thermostats, allowing for more precise and accurate environmental control of the entire home or building. The local area network is connected to the internet and the automation system is controllable remotely by a mobile device or computer via the internet.

18 Claims, 6 Drawing Sheets

HOME AUTOMATION SYSTEM PROVIDING REMOTE ROOM TEMPERATURE CONTROL

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention generally relates to home automation and more specifically to a system and method for remotely controlling room temperature from a mobile device.

2. Description of Related Art

There has been a significant trend in the market with respect to home automation, particularly with respect to new building construction. Generally, home automation has been employed to allow for electronic control of devices systems throughout the home such heating-air conditioning-ventilation (HVAC) systems, lighting systems, security systems, home appliances, garage doors, and the like. Home automation is particularly useful with respect to HVAC systems, allowing the user to control the home's air conditioning and/or heating systems from a central unit that not only functions as a typical thermostat, but also allows for control of the home's other systems (lighting, security, etc. . . . ).

In many instances, these home automation systems employ a primary "brain" or "head unit" which is in electrical communication with the various switches and relays that control the systems within the home. The user can then manipulate and control those systems from the solitary head unit without the need to interact with the discrete controls of the specific systems. The user can also utilize the "scheduler" features of these home automation systems to allow for automatic scheduling of activation/deactivation of home systems without the need for external input for the user. Many of these systems are internet-ready and provide a means for the user to access and manipulate the "brain" from a remote location, over the internet, by way of a computer, laptop, smart phone, tablet, or other like device. These recent advances in home automation have been employed to provide improved convenience, comfort, energy efficiency and security for homeowners while also adding a bit of panache and technology to home life that would otherwise not be present.

The downside to these home automation systems, however, is the overall cost and limited versatility of the systems and devices used for such systems. Often times, for an HVAC system to be integrated into a home automation system, the user will have to install multiple high-dollar thermostats in each desired location in the home, and may need to employ more than one air conditioning unit in order to provide the desired heating and cooling in the specific room. Under these current systems, if additional thermostats and air conditioning units are not provided, then the user must rely on a single air conditioning unit and a single thermostat to provide temperature regulation inside the home. In many instances, a single thermostat will be installed in a central location of the home and, while adequately regulating the temperature within the home, it cannot precisely determine the temperature in each room of the house and alter its performance accordingly. Rather, these single thermostat systems take a "best guess" as to the air quality in the home. This means that a remote room at the end of a hall may have significant higher humidity levels and air temperature than the remainder of the home, unbeknownst to the central thermostat. Thus, to date, the only means of solving this problem has been to install the aforementioned plurality of air conditioning units married to a plurality of thermostats. While these multiple thermostat and air conditioning units can be tied into a single home automation "brain," such an installation carries a high cost of entry, higher operating costs, and significant overall energy consumption compared to traditional single thermostat/single AC unit arrangements.

Additional complexities arise when attempting to integrate security and safety functionality into home automation systems. As with the HVAC systems, there are significant cost barriers when considering whether to install a multitude of proximity sensors, security cameras, smoke detectors, carbon dioxide sensors and the like. Often time, home owners are relegated to an "a la carte" approach where each sensor, camera and detector must be purchased and installed separately and only then integrated into the "brain" of the home automation system. Aside of the obvious cost constraints, such installations greatly increase the complexity and potential for failure of the home automation system.

There have been several attempts at providing improved systems and methods for home automation with particular emphasis on HVAC system control; however, none have solved the aforementioned problems.

For example, U.S. Pat. No. 4,969,508 to Tate et al. describes a system and method of environmental control allowed the occupant of a room in a multi-room building sharing a single air supply with other rooms to control the temperature in his room selectively. The system employs a small remote control which is in radio transmission with a primary control unit couple to the external environmental controls which control valve dampeners and vents in the occupant's room. Thus, while providing some basic level of customizable control, the system in Tate provides no automatic functionality such as automatic temperature control and cannot be readily integrated into a modern home automation system accessible by a mobile device.

U.S. Pat. No. 5,386,461 to Gedney describes an HVAC unit being controlled by one or more thermostats in response to switch the setting of which is controlled by dual tone multiple frequency signals sent from a regular telephone over ordinary phone lines. While providing remote communication ability, it does not allow for independent room temperature detection and control and also does not provide a means for wireless remote actuation.

U.S. Application Publication No. 2005/0159823 to Hayes et al. describes a home control and automation systems and method that allows for the control of the household devices that includes internet-enable capability. While providing certain networked and integrated home automation features, the system lacks the ability to provide independent room temperature control.

U.S. Pat. No. 5,839,654 to Weber describes a system for wireless control of an air conditioner or space heat by a remote thermostat combined with a control signal transmitter placed near the user. In some embodiments, a wireless control receives responsive to the transmitter is included as a portion of a plug-in adapter that plus directly into an AC outlet and an ordinary plug from the air conditioner unit is plugged into the adapter for remote on/off capability. While providing remote actuator of an air conditioning unit, the system in Weber lacks internet-enabled functionality as well as home automation functionality. It also does not provide a means to pool air temperatures to provide more accurate temperature regulation.

It is, therefore, to the effective resolution of the aforementioned problems and shortcomings of the prior art that the present invention is directed. However, in view of the HVAC home automation technologies in existence at the time of the present invention, it was not obvious to those persons of ordinary skill in the pertinent art as to how the identified needs could be fulfilled in an advantageous manner.

SUMMARY OF THE INVENTION

The present invention comprises a home or building automation system, comprising one or more remote thermostats, each of the remote thermostats including an environmental sensor array configured to sense temperature and humidity and at least one thermostat controller in electrical communication with an HVAC system. The remote thermostats and the thermostat controller are in electrical communication over a local area network, which may be a wired or wireless local area network. The thermostat controller receives, over the local area network, computer-readable environmental data from the one or more remote thermostats corresponding to the temperature and said humidity in the location where the remote thermostat is installed. The thermostat controller conditionally controls the HVAC system based on said environmental data received from the remote thermostats, allowing for more precise and accurate environmental control of the entire home or building, and the specific rooms or spaces in which the remote thermostats are installed.

In some embodiments, the wired or wireless local area network is in communication with the internet allowing for remote access of the automation system over the internet by way of a computing device such as a mobile device or a computer. The computing device includes a client-side application that is configured to communicate with a server-side Application executing on said thermostat controller, therefore allowing for the user to control the automation system remotely by way of the client-side application.

The one or more remote thermostats and the thermostat controller include a network interface configured to transmit said environmental data over local area network. The network interface may be wireless or wired as desired. In some embodiments, the one or more remote thermostats also includes a display, a motion sensor, and a night light. In some embodiments, the thermostat controller is in electrical communication with a security system wherein the thermostat controller is configured to receive security data from the remote thermostats corresponding to activation of the motion sensors and wherein the thermostat controller conditionally controls the security system based on the security data.

Further disclosed is a method of home automation, comprising providing a thermostat controller, wherein the controller is in electrical communication with an HVAC system; providing one or more remote thermostats, each remote thermostat including an environmental sensor array configured to sense temperature and humidity; establishing a bi-directional communications link between the thermostat controller and the one or more remote thermostat, said communications link established over a local area network; whereby the thermostat controller receives, over the local area network, computer-readable environmental data from the one or more remote thermostats corresponding to the temperature and the humidity; and whereby the thermostat controller conditionally controls the HVAC system based on the environmental data received from said remote thermostats.

Accordingly, it is an object of the present invention to provide a home automation system and method that utilizes compact and inexpensive remote thermostats to provide for more precise and accurate environmental control within a house or dwelling.

It is another object of the present invention to provide a home automation system and method that includes one or more remote thermostats networked with a primary thermostat controller wherein the controller is configured to read and pool data and information detected by the remote thermostats and transmitted over the network.

It is yet another object of the present invention to provide a home automation system and method wherein an automation network of thermostats and primary controllers is internet-enabled such that a user can access the network and its various settings and controls from a remote mobile device or computer.

In accordance with these and other objects which will become apparent hereinafter, the instant invention will now be described with particular reference to the accompanying drawings.

DETAILED DESCRIPTION

Figure 1:
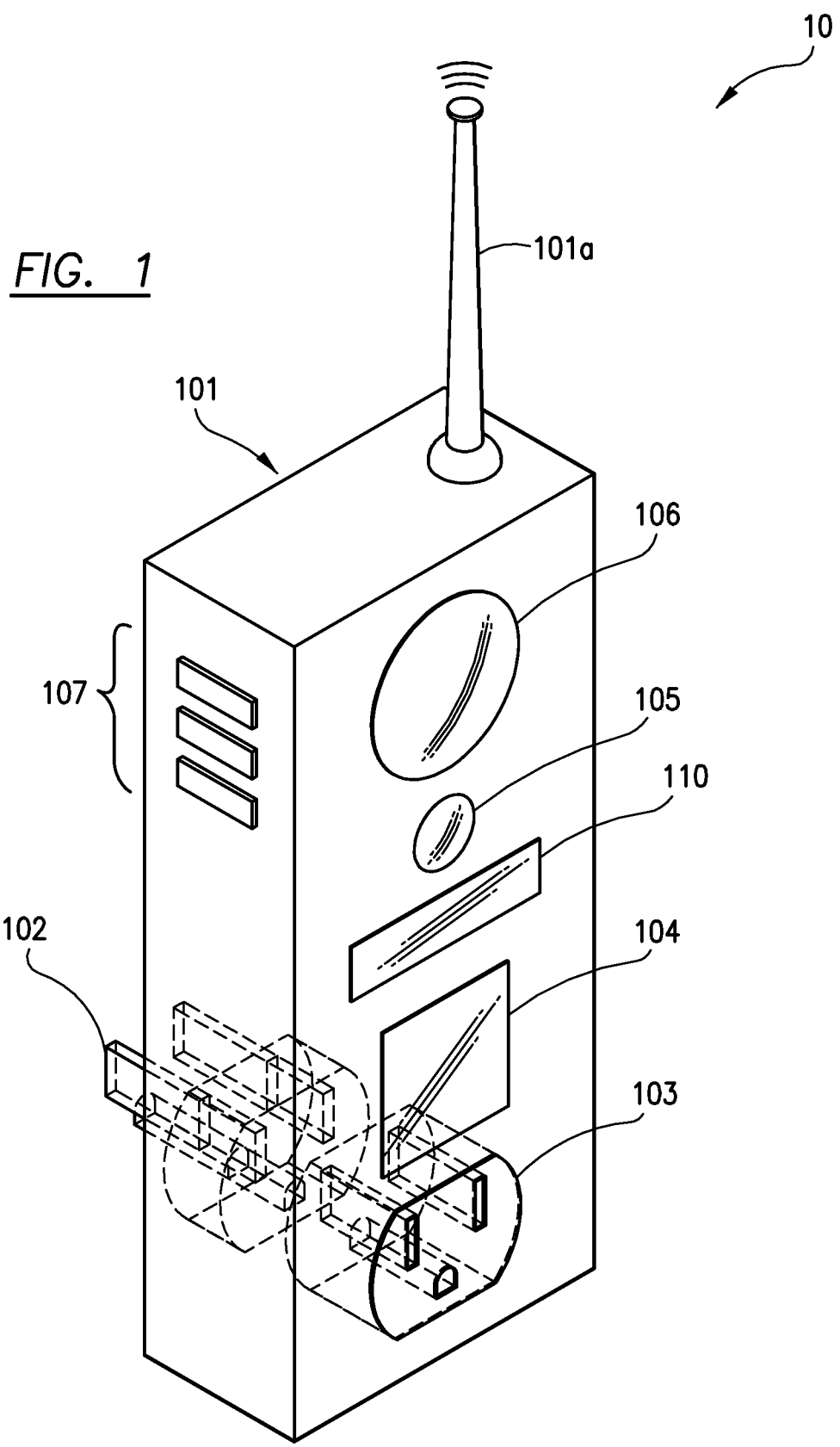
FIG. 1 is a front perspective view of one embodiment of the remote thermostat of the present invention.

The present invent comprises a system and method for home automation providing an advanced heating-air conditioning-ventilation (HVAC) system control and environmental regulation. With reference to FIG. 1, the present system and method employs one or more remote thermostats 10 which are intended to be placed strategically throughout a building or dwelling. In some embodiments, the remote thermostat 10 generally comprises a housing 101 which encases and contains the various electric components of the thermostat 10. The thermostat 10 includes an AC plug 102 which is adapted to be received in a typical AC wall outlet. The plug 102 can be configured to be receivable in any type or specification of wall outlets known in the art. A pass-though convenience outlet 103 is provided on the thermostat 10 itself, such that the device does not render useless an otherwise open wall outlet. The thermostat 10 further includes an environmental sensor array 104 and may optionally include a motion sensor 105 and a night light 106. The motion sensor 105 may also double as a security camera. The environmental sensor array 104 comprises one or more sensors adapted to detect air temperature and air humidity and generate an electronic signal corresponding to the temperature and humidity. One or more input controls 107 may be provided and may be configured as mechanical or electro-mechanical buttons, actuators, switches, or the like, which may be used to power the device on and off, adjust settings, activate the night light 106 etc. Optionally included on thermostat 10 is a display 110, which may comprise a liquid crystal or LED display known in the art. The display 110 can be used to display temperature and humidity readouts, status readouts and the like. A receiver/transmitter antenna 101a is shown externally from housing 101 but can be mounted inside the housing 101.

It is understood that the size and shape of the housing 101 is not limited to the generally rectangular-box shape design shown; rather, the size and shape can vary depending on the desired aesthetics and included features. It is appreciated, however, that the thermostat 10 be generally relatively compact and lightweight such that it is unobtrusive in a dwelling and can be easily moved.

Figure 2:
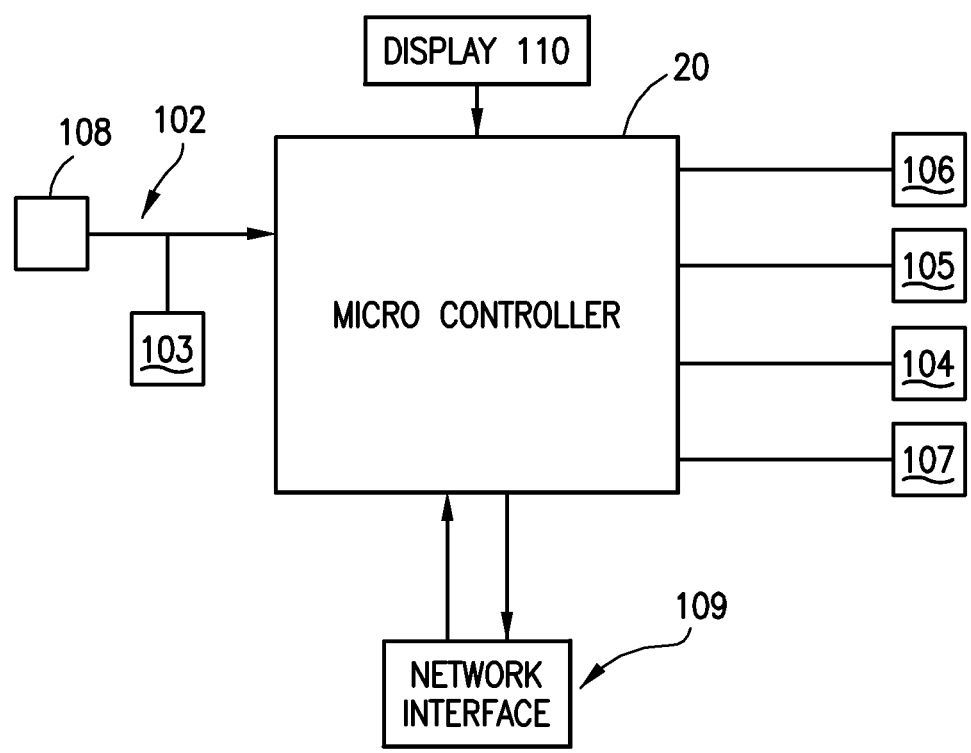
FIG. 2 is a schematic of the components of one embodiment of the remote thermostat of the present invention.

The remote thermostat 10 is configured as a network and internet-enabled device. With reference to FIG. 2, shown is a schematic of the working components of one embodiment of the remote thermostat 10 of the present invention. The remote thermostat 10 includes a microcontroller 20 comprising a central processing unit including a microprocessor, on-board memory, software, logic, and interface means. The microprocessor is in electrical communication with the components of the thermostat 10 including the environmental sensor array 104 and optionally motion sensor 105, night light 106, controls 107, and display 110. The microcontroller receives power from power source 108 over plug 102. Convenience outlet 103 is in pass-through electrical communication with plug 102 such that outlet 103 also receives power from power source 108. It is appreciated that in some embodiments, the device is powered by power source 108 configured as an AC outlet, in other embodiments the thermostat may be powered by an internal or external battery, including rechargeable batteries known in the art. The microcontroller 20 is further is electrical communication with network interface 109. Network interface 109 may comprise a wireless or wired network interface device or modem. In some embodiments, the network interface 109 comprises a WiFi transmitter/receiver. In other embodiments, the network interface 109 comprises a network interface card having a wired RJ45 Ethernet connector. The network interface 109 allows for bi-directional communication between the remote thermostat 10 and a computer network and/or other devices, as described in further detail below.

Figure 3:
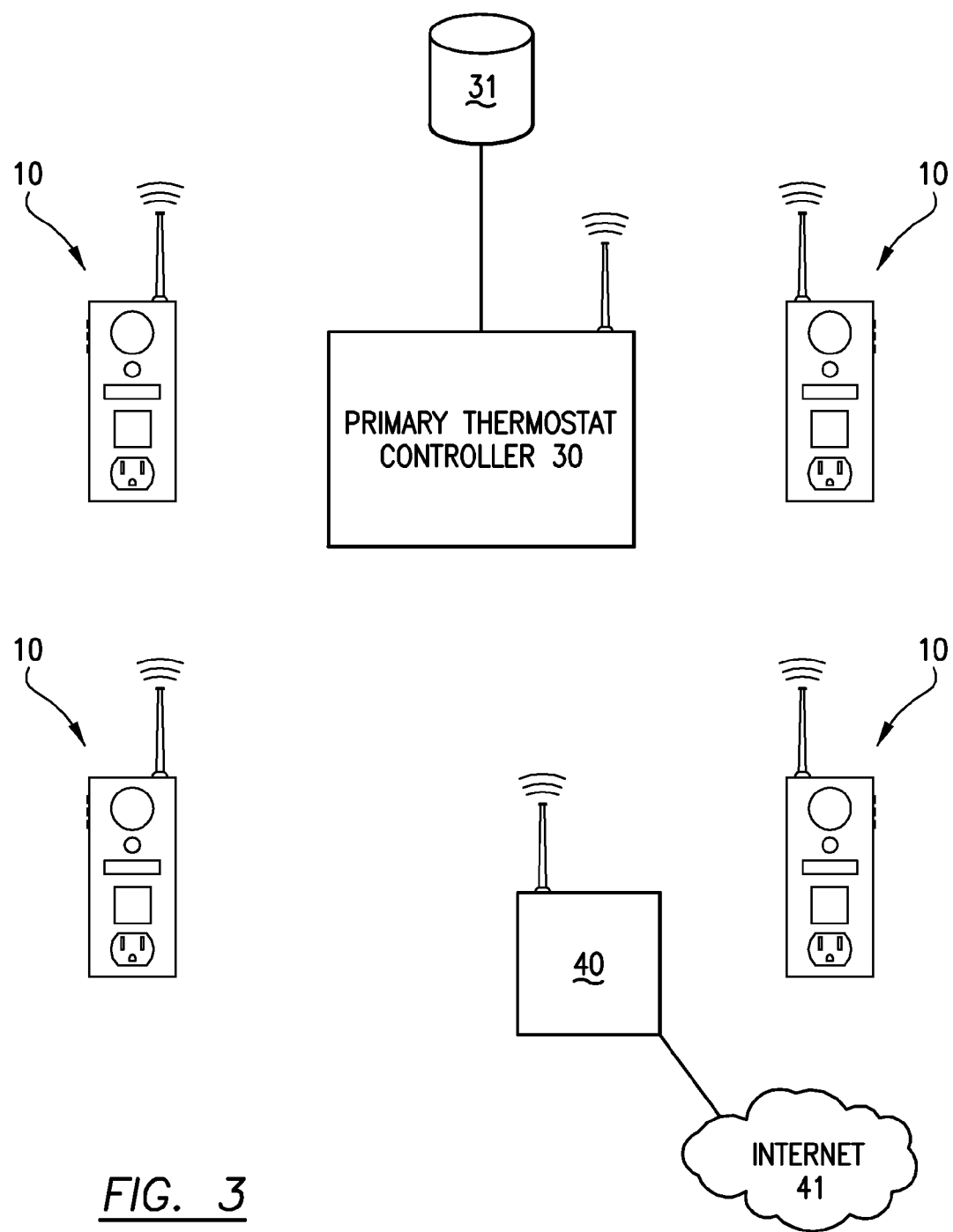
FIG. 3 is a schematic of one embodiment of the home automation system and network of the present invention.

With reference to FIG. 3, shown is the network environment within which one or more of the remote thermostats 10 are configured to operate with respect to the automation system and method of the present invention. A primary thermostat controller 30 is provided which is in electrical communication with an HVAC system 31. The HVAC system 31 may comprise a heater, air conditioner, or other ventilation and/or air handling unit. Generally, the primary thermostat controller includes typical thermostat functionality such as an environmental sensor array 104 (like the remote thermostats 10) whereby the controller 30 can sense and detect air temperature and humidity. The primary thermostat controller 30 is also configured to activate and deactivate the HVAC system 31 based on its programming and may do so both automatically and manually. For example, the primary thermostat controller 31 may employ a feedback loop whereby the HVAC system as an air conditioner is activated until the desired set temperature is reached, then the controller 31 deactivates the HVAC system until the temperature rises above (or below in the case of a heater) the set temperature. In some embodiments, the primary thermostat controller 30 includes similar features to the remote thermostats 10 including a microcontroller, a display, the aforementioned environmental sensor array, and selectors. The microcontroller generally includes software and logic that is more robust than the remote thermostats 10, but is not required to necessarily.

The primary thermostat controller 30 establishes a bi-lateral communications link with one or more remote thermostats 10 over a computer communications network such as a local area network or the internet. In some embodiments, the local area network is a wireless network created by wireless gateway 40. In other embodiments, a wired network is created using a wired gateway and wired connections between the thermostats and the gateway. It is appreciated that both wired and wireless links may be utilized together depending on the desired system layout.

The bi-lateral communications link is established between the remote thermostats 10 and the primary thermostat controller 30 in order to provide enhanced conditional climate control functionality. For example, in a typical HVAC system, a single thermostat is located in a central location in a dwelling or building and is employed to detect and sense the temperature in that location and control the HVAC system in accordance with that temperature. While this situation is adequate for automatic air conditioning control functionality, it doesn't take into account variations in temperature thorough the dwelling and in particular in rooms or spaces relatively remote from the thermostat. Accordingly, the present invention provides a system and method for more accurate temperature regulation.

One or more remote thermostats 10 are provided in one or more rooms or spaces in a given dwelling. Each of the remote thermostats is capable of detecting temperature and humidity in the space or room that it occupies and relaying this temperature and humidity information as computer-readable environmental data to the primary thermostat controller 30. The primary thermostat controller 30 can then read the environmental data received from the one or more remote thermostats 10 and conditionally and dynamically respond by activating/deactivating the HVAC system 31 it is connected to in accordance with a desired outcome. For example, if the primary thermostat controller 30 is placed in an automatic temperature regulation setting wherein the desired temperature is 72 F, the user can select a program whereby the primary thermostat controller 30 operates the HVAC system 31 until the average temperature reading across the one or more remote thermostats (and the primary thermostat controller) is the desired temperature of 72 F. In the alternative, the controller 30 could run the HVAC system 31 until each remote thermostat (and the primary thermostat controller) records a reading of the desired temperature of 72 F. In other embodiments, the controller 30 could run the HVAC system 31 until a one of the remote thermostats records a reading of the desired temperature of 72 F.

In this sense, an unlimited number of desired environmental conditions can be identified to the system and carried out through temperature detection by the remote thermostats coupled with the bi-lateral communications link with the primary thermostat controller 30. In some embodiments, this allows for an HVAC system wherein the system is not reliant on a single temperature reading at a centralized and somewhat random location, but rather the system can pinpoint the conditions in one room or space and provide heating/cooling until a desired end result is reached in that particular space. This functionality is particularly useful in a situation where it is difficult to maintain a desired temperature in a particular room or space because of a lack of insulation, sun exposure, wind exposure, or the like. Accordingly, rather than rely on a single centralized thermostat's "best guess," the present system and method can provide much more precise and accurate environmental control. This functionality can greatly increase the efficiency of an HVAC system, leading to substantial energy and cost savings. Further still, this functionality allows the primary thermostat controller 30 to receive environmental data in a pooled or aggregate fashion in order to better understand the environmental conditions throughout the dwelling or building, and react accordingly to assure proper temperature and humidity regulation.

Figure 4:
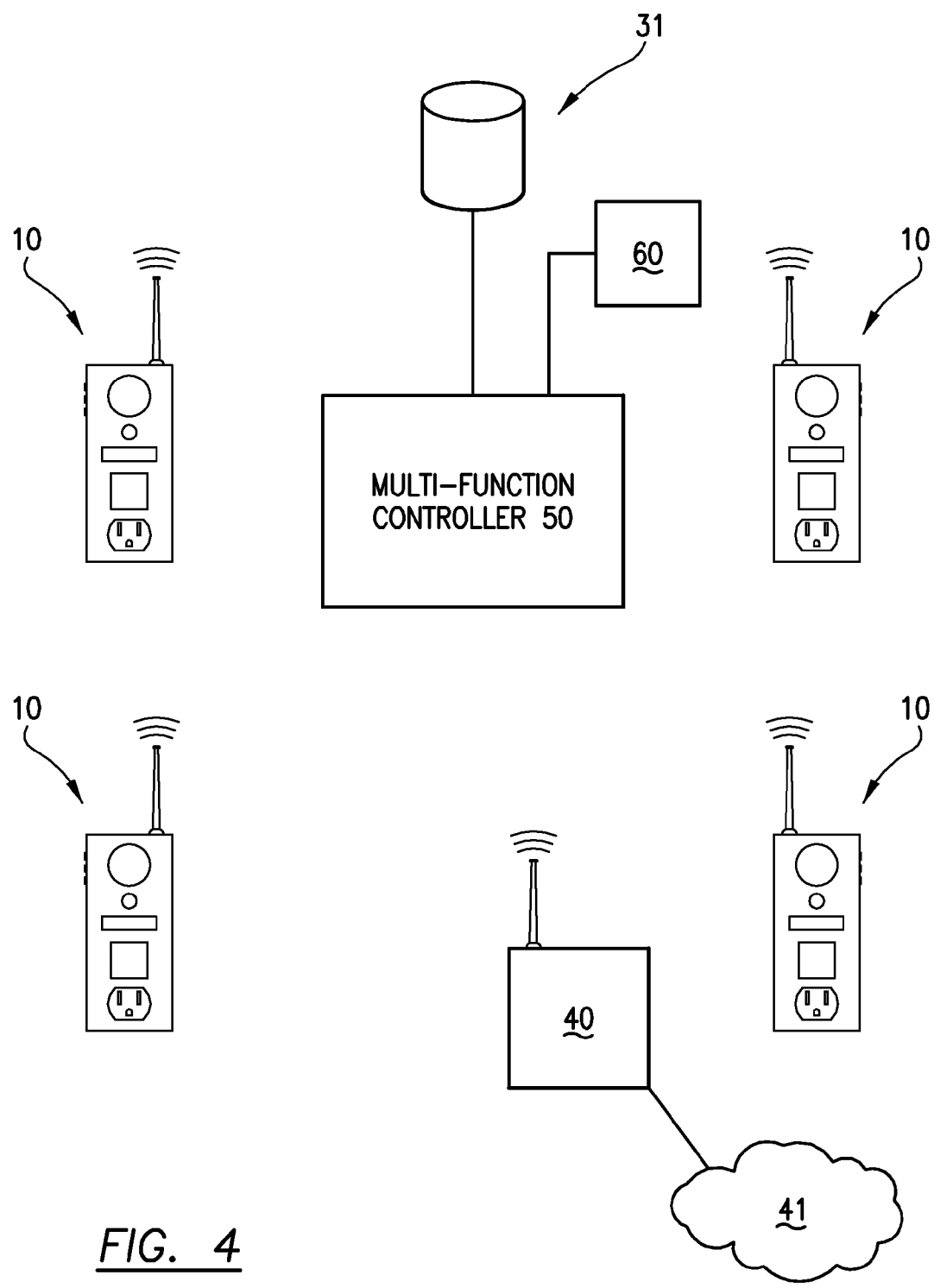
FIG. 4 is a schematic of another embodiment of the home automation system and network of the present invention.

For more advanced operations and functionality, FIG. 4 depicts another exemplary embodiment of the present invention. Here, the primary thermostat controller is integrated into a multi-function controller 50. In some embodiments multi-function controller 50 is a "head unit" or "brain" for a broader home automation system which may comprise a computer or computer-like device that is in electrical communication with a plurality of systems within the home, including but not limited to, HVAC systems, security systems, lighting systems, appliances, entry ways, gates and the like. In the depicted embodiment, the multi-function controller 50 is in electrical communication with HVAC system 31 and security system 60. Accordingly, controller 50 is configured to function as a primary thermostat for the HVAC system 31 while also doubling as an input and control panel for the security system 60. One or more remote thermostats 10 are networked together and with multi-function controller 60 by way of wireless gateway 40, establishing a bi-directional communications link between the thermostats 10 and the controller 50. In this embodiment, the remote thermostats 10 can utilize their environmental sensor arrays 104 and their wireless network interface 109 to transmit computer readable environmental data to the multi-function controller 50 to carry out precise environmental control as discussed above. In addition, the motion sensors 105 on each of the remote thermostats 10 can be in communication with the security features of the controller 50 such that, if the security system is armed, and the motion sensors 105 are activated, computer readable security data can be transmitted over the network from the remote thermostats to the controller 50. The controller 50 can react conditionally by setting off the alarm, alerting authorities, or the like. Additionally, the controller 50 can send a signal to one or more of the remote thermostats 10 which signal can activate the night light 106 on demand or even automatically in response to motion sensor activation or other conditions. It is further appreciated that the thermostats 10 could each include a security camera which could transmit video or pictures over the bi-directional communications link to the multi-function controller 50 for display thereon, or in as described further below.

The software and logic of the primary thermostat controller 30, micro controller 20, and/or multi-function controller 50 may be configured to process and calculate a "real feel" measurement, which is a calculation of the temperature felt by an occupant of the space where the thermostat is, taking into account humidity. This calculation provides a more accurate indication of the conditions in the space as compared to a straight temperature reading. This "real feel" measurement could be displayed on the remote thermostats 10 or on the display of the primary thermostat controller 30 and/or controller 50. Further, the system can be programmed to achieve a desired "real feel" temperature (instead of actual temperature) and therefore the controllers 30 or 50 can activate/deactivate the HVAC system 31 based on the temperature and humidity conditions of the space or spaces so controlled.

Figure 5:
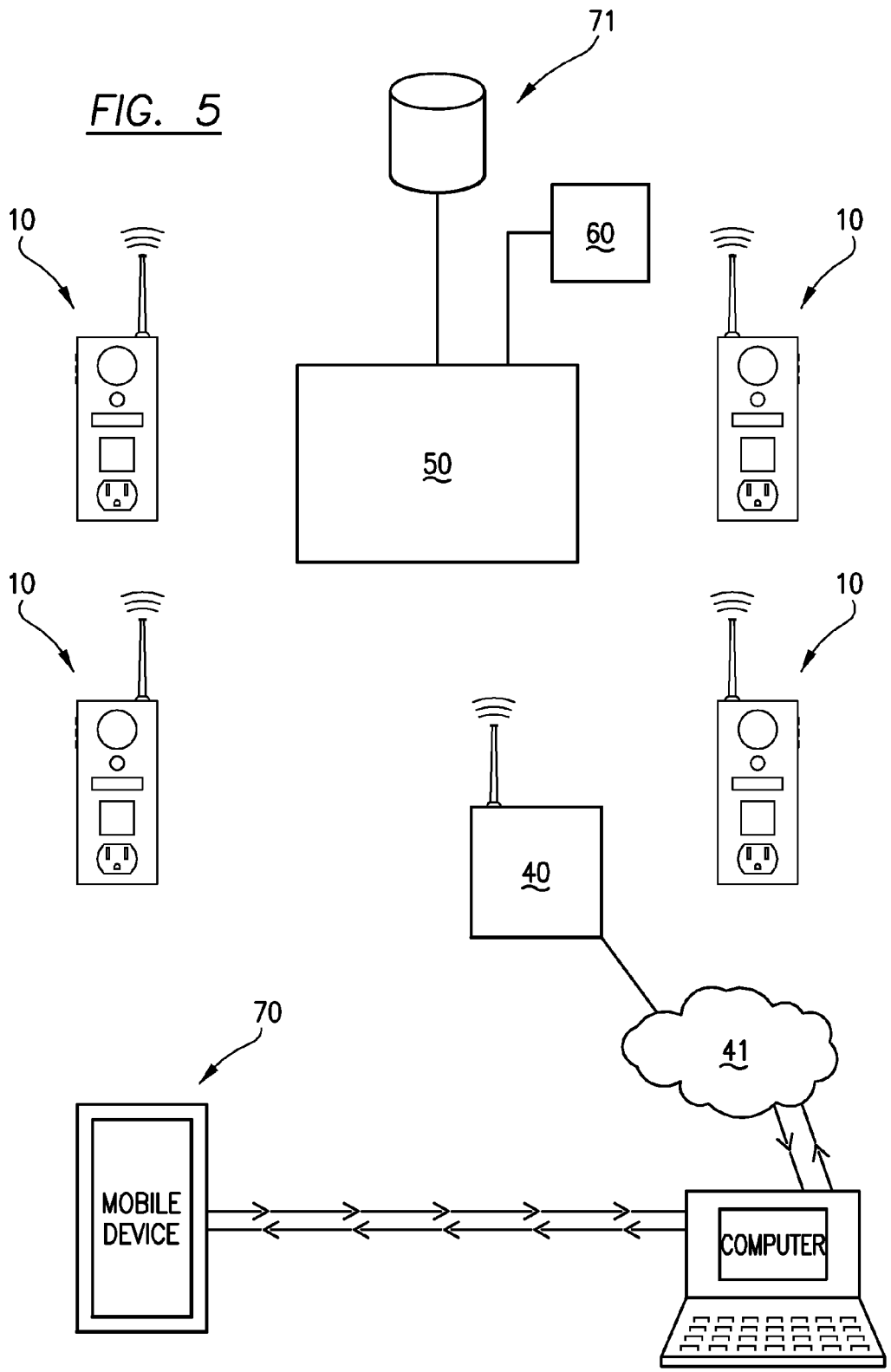
FIG. 5 is a schematic of yet another embodiment of the home automation system and network of the present invention, wherein a mobile device and/or computer is interfaced therewith.

With reference to FIGS. 3-5, it is further appreciated that the internet connection 41 can provide an expansive set of features and adds to the overall functionality of the system and method of the present invention. As shown, the controller 30/50 and the thermostats 10 are interconnected by way of a local area network provided by gateway 40. In the depicted embodiments, the local area network is wireless by way of the wireless gateway 40 however a wired network or combination wired/wireless network is equally suitable. In some embodiments, the wireless gateway 40 is connected to the internet 41. The internet 41 connection can be provided by those means known in the art such as a dial-up modem connection or a broadband connection. Software and logic built into the controller 30/50 and/or the remote thermostats 10 can provide a software interface permitting remote connectivity and manipulation of the automation system of the present invention by way of internet 41. Remote access to the automation system can be obtained by way of a mobile device 70 or a computer 72, which are in bi-directional communication with the internet 41 as well. It is appreciated that the mobile device 70 and computer 72 may comprise a variety of known computer devices such as smart phones, tablet computers, personal information manager devices, laptop computers, desktop computers and the like.

In some embodiments, the mobile device of computer is provided with a software utility application that provides access to the automation system. The software utility application, i.e. client-side application, on the mobile device or computer establishes a bi-directional link with corresponding software running on the controller 30/50, i.e. server-side application wherein the link is established over the internet. This permits the mobile device or computer to access the automation system and network remotely. Such a link may be established by way of internet protocol relaying means or other internet-based communications means known in the art.

Figure 6:
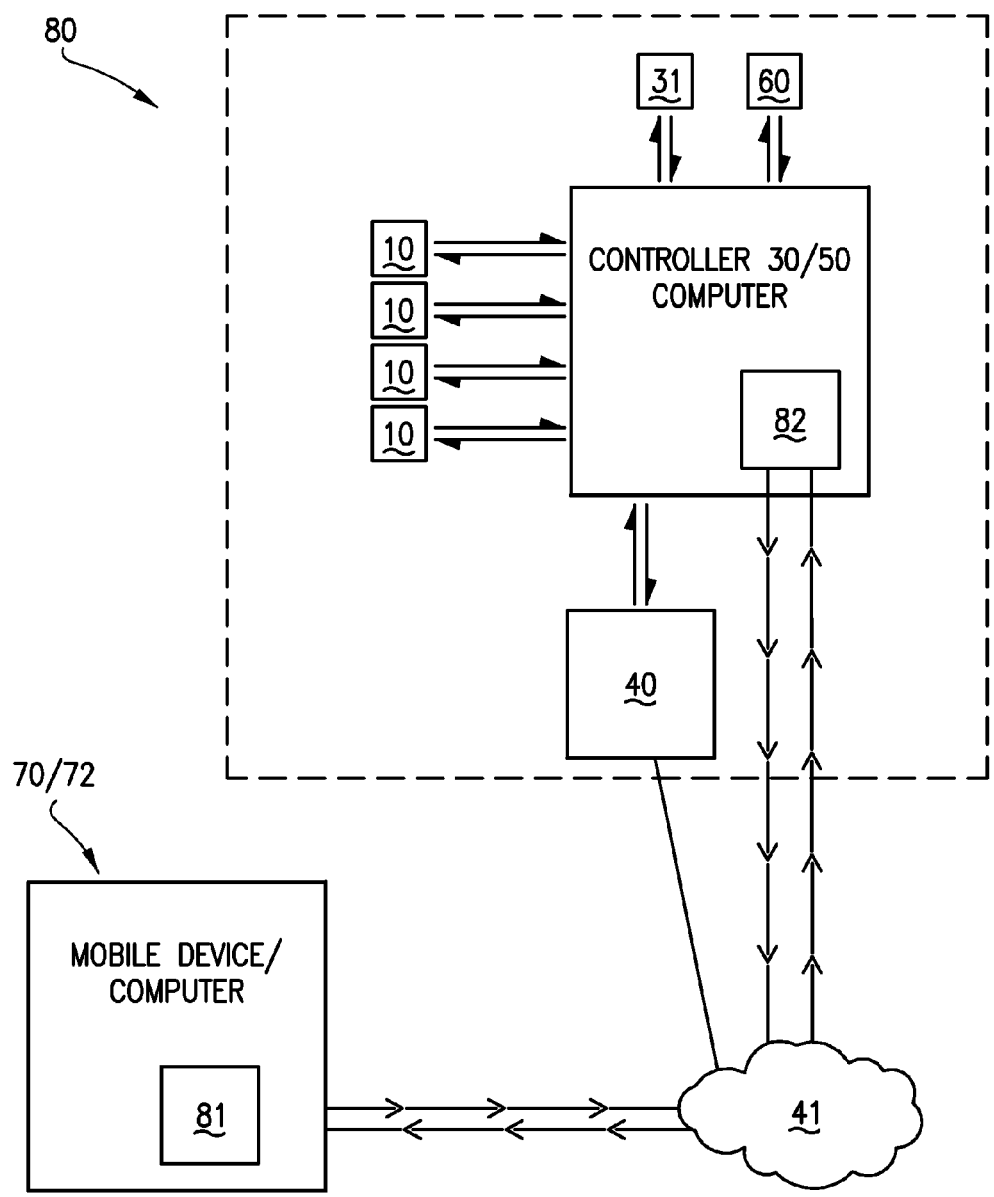
FIG. 6 is an exemplary schematic showing the relationship between the client-side application and the server-side application utilized in the present invention, along with the other components of the automation system of the present invention.

From the utility application, the user can view the status of the HVAC and security features of the automation system including readouts of the temperature, humidity, and "real feel" of each remote thermostat and primary thermostat controller or multi-function controller. The user can also change the temperature and adjust the HVAC system settings directly from the remote mobile device or computer, such as, for example, to decrease the air temperature in the home as the user is driving home so that the home is cool upon arrival. The user can also program the server-side application from the client-side application to generate conditional responses and or activity. For example, the user can set predetermined alarms or alerts if the temperature readout of any remote thermostat or controller 30/50 is above a certain threshold, perhaps indicating a potential fire or malfunction in the home. The client-side application on the mobile device or computer could also be alerted by the server-side application if one or more of the motion sensors of the remote thermostat registers motion or is "tripped." The user can also use the client-side application on the mobile device or computer to activate the night light 106 on the one or more remote thermostats 10. Further still, the user may be able to view the output of one or more of the cameras that may be present in the home or in the remote thermostat such that he is alerted of intruders or other potential foul play at the home. All of this information can be relayed from the controller 30/50 to the mobile device or computer by way of the internet 41. FIG. 6 is an exemplary schematic showing the relationship between the client-side application 81 and the server-side application 82, along with the other components of the automation system described above, defining an integrated home automation system 80 allowing for precise environmental control and remote access. It is appreciated the client-side application may comprise a native application executing on a mobile device or a computer, but alternatively, the client-side applicable may be web-based and accessible by any web browser on any device having an internet connection and web browsing capability.

It is appreciated that the present is modular, expandable, and scalable to any home, building or dwelling as desired and needed. Any number of remote thermostats 10 can be provided, it being understood that the more remote thermostats 10 placed throughout the home, the more precise the environmental control can be. Additionally, more than one controller 30/50 may be provided if it desirous and necessitated by the overall complexity of the dwelling. For example, in multi-story dwellings or buildings, a controller 30/50 may be placed on each floor with multiple remote thermostats 10 on that floor correspondingly linked to the controller 30/50. This allows for an unlimited number of independent or dependent automation system circuits to be built. For example, each floor can have its own controller 30/50 each linked to multiple remote thermostats 10 and each controller 30/50 can also be linked to each other globally by way of the local area network or over the internet generally. It is appreciated that the remote thermostats 10 and controllers 30/50 can include identification means such as a unique IP address or other identifier that allows the system to be configured properly. Configuration can take place by way of software applications on the controller, or by way of an ad-hoc software application running on a computer that is momentarily connected to the controller 30/50 for configuration. It is further appreciated that the remote thermostats 10 and the controllers 30/50 need not necessarily be in bi-directional communication over a local area network, but could be in bi-directional communication over the internet or other computer network directly, without the need for a local area network to be established. However, in many practical settings, a home or building is already wired with a local area network by way of a wireless or wired gateway, and therefore the present invention can utilize this pre-existing local area network without the need to reconfigure or rewire the home or building.

It is further appreciated that the remote thermostats 10 are portable, easy to install and operate, and relatively inexpensive, therefore allowing for tremendous scalability of the system without the exponentially increasing costs associated with known home automation systems. In that sense, the remote thermostats 10 can operate somewhat analogously to "thin-clients" wherein the remote thermostat functions as a multi-purpose sensor tied into a greater home automation network wherein the remote thermostat is charged with detecting conditions (environmental, security, motion, etc. . . . ) and relaying that information to the controller 30/50 for further analysis and processing. The thermostats 10 may also include additional features such as a smoke detector and carbon monoxide detector which can be integrated into or discrete from the environmental sensor array 104.

As mentioned above, the remote thermostat 10 can be powered by general household AC power by way of plug 102 or by way of an internal or external battery source. Alternatively, the remote thermostat 10 could be professionally installed into a wall or fixture in the dwelling or building and be hardwired to the power grid of same. Although this would limit the portability of the device, it may be desirable for aesthetics and to prevent tampering. In this sense, the remote thermostats 10 could replace standard power outlets in rooms and spaces and, in conjunction with the pass through power outlets provided, can provide a sleek and integrated installation in the home which provides power outlet functionality in addition to the environmental, security, and home automation features described herein.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A home automation system, comprising:
   one or more plug-in portable remote thermostats, each of said remote thermostats including an environmental sensor array configured to sense temperature and humidity, a display, a motion sensor, a carbon monoxide sensor, a security camera, and a pass-through convenience power outlet;
   at least one thermostat controller in electrical communication with an HVAC system;
   wherein said remote thermostats and said thermostat controller are in electrical communication over a local area network;
   wherein said thermostat controller receives, over said local area network, computer-readable environmental data from said one or more remote thermostats corresponding to said temperature and said humidity;
   wherein said thermostat controller conditionally controls said HVAC system based on said environmental data received from said remote thermostats; and
   wherein said thermostat controller is in electrical communication with a security system wherein said thermostat controller is configured to receive security data from said remote thermostats corresponding to activation of said motion sensors and wherein said thermostat controller conditionally controls said security system based on said security data.

2. The system of claim 1, wherein said local area network comprises a wireless local area network.

3. The system of claim 2, wherein said wireless local area network is established by a wireless gateway.

4. The system of claim 2, wherein said wireless local area network is in communication with the internet.

5. The system of claim 4, wherein said home automation system is remotely accessible over the internet by way of a computing device.

6. The system of claim 5, wherein said computer device comprises a mobile device.

7. The system of claim 5, wherein said mobile device includes a client-side application that is configured to communicate with a server-side application executing on said thermostat controller.

8. The system of claim 7, wherein said client-side application is configured to control said thermostat controller to control said HVAC system.

9. The system of claim 1, wherein said one or more remote thermostats includes a network interface configured to transmit said environmental data over local area network.

10. The system of claim 3, wherein said network interface comprises a wireless network interface device.

11. A method of home automation, comprising:
    providing a thermostat controller, said controller in electrical communication with an HVAC system;
    providing one or more plug-in portable remote thermostats, each remote thermostat including an environmental sensor array configured to sense temperature and humidity, a display, a motion sensor, a carbon monoxide sensor, a security camera, and a pass-through convenience power outlet;
    establishing a bi-directional communications link between said thermostat controller and said one or more remote thermostat, said communications link established over a local area network;

whereby said thermostat controller receives, over said local area network, computer-readable environmental data from said one or more remote thermostats corresponding to said temperature and said humidity; and whereby said thermostat controller conditionally controls said HVAC system based on said environmental data received from said remote thermostats.

12. The method of claim 11, wherein said local area network comprises a wireless local area network.

13. The method of claim 12, wherein said wireless local area network is in communication with the internet.

14. The method of claim 13, wherein said home automation system is remotely accessible over the internet by way of a computing device.

15. The method of claim 14, wherein said computer device comprises a mobile device.

16. The method of claim 15, wherein said mobile device includes a client-side application that is configured to communicate with a server-side application executing on said thermostat controller.

17. The method of claim 16, wherein said client-side application is configured to control said thermostat controller to control said HVAC system.

18. The method of claim 11, wherein said one or more remote thermostats includes a network interface configured to transmit said environmental data over local area network.

* * * * *